(12) United States Patent  
Ding et al.

(10) Patent No.: US 9,016,209 B2  
(45) Date of Patent: Apr. 28, 2015

(54) TRANSVERSE ADJUSTMENT MECHANISM FOR BILATERAL HALF-SPRING TYPE LOAD-CARRYING HEAD

(71) Applicant: Qingdao Sifang Rolling Stock Research Institute Co., Ltd., Qingdao (CN)

(72) Inventors: Hui Ding, Qingdao (CN); Xiaodong Xing, Qingdao (CN); Xingtian Zhang, Qingdao (CN); Minghai Wang, Qingdao (CN); Zhenggang Xu, Qingdao (CN); Lipeng Shao, Qingdao (CN)

(73) Assignee: Qingdao Sifang Rolling Stock Research Institute Co., Ltd., Shandong (CN)

( * ) Notice: Subject to any disclaimer, the term of this patent is extended or adjusted under 35 U.S.C. 154(b) by 219 days.

(21) Appl. No.: 13/914,438

(22) Filed: Jun. 10, 2013

(65) Prior Publication Data

US 2013/0255412 A1 Oct. 3, 2013

Related U.S. Application Data

(63) Continuation of application No. PCT/CN2011/075265, filed on Jun. 3, 2011.

(30) Foreign Application Priority Data

Dec. 10, 2010 (CN) .......................... 2010 1 0581626

(51) Int. Cl.  
*F16H 25/20* (2006.01)  
*B61K 5/00* (2006.01)  
(Continued)

(52) U.S. Cl.  
CPC ........... *F16H 25/20* (2013.01); *Y10T 74/18576* (2015.01); *B61K 5/00* (2013.01); *B66F 7/14* (2013.01); *B66F 7/28* (2013.01)

(58) Field of Classification Search  
CPC ................ F16H 25/20; F16H 25/2006; F16H 2025/2012; B61K 5/00; B66F 7/02; B66F 7/12; B66F 7/14; B66F 7/28; B66F 19/00; B61D 15/00; B61D 15/02; Y10T 74/18576

USPC .................................. 104/32.1, 33; 74/89.23  
See application file for complete search history.

(56) References Cited

U.S. PATENT DOCUMENTS

| | | | | |
|---|---|---|---|---|
| 3,367,283 | A * | 2/1968 | Ladoues et al. | 104/32.1 |
| 7,900,562 | B2 * | 3/2011 | Esposti et al. | 104/32.1 |
| 2009/0145326 | A1 * | 6/2009 | Esposti et al. | 104/32.1 |

FOREIGN PATENT DOCUMENTS

| | | |
|---|---|---|
| CN | 201164990 Y | 12/2008 |
| CN | 201437361 U | 4/2010 |

(Continued)

OTHER PUBLICATIONS

Extended European Search Report of corresponding European Application No. 11846304.1 / PCT/CN2011/075265, dated Sep. 27, 2013.

(Continued)

*Primary Examiner* — Zachary Kuhfuss  
(74) *Attorney, Agent, or Firm* — J.C. Patents

(57) ABSTRACT

A transverse adjustment mechanism for a bilateral half-spring type load-carrying head is installed in the casing of the load-carrying head of the lifting unit of a pit type unwheeling machine, fixedly connected with the casing, directly connected to an adjustment unit at the end of the load-carrying head, and installed on a lead screw of the adjustment unit. The transverse adjustment mechanism includes an adjusting nut, an adjusting nut guide, a guiding tube, and a guiding sleeve, a nut mounting plate, a flange plate, a compression spring and a sliding shaft. The invention is currently applied to the transverse adjustment of the no-loading heads and transverse fine adjustment of the load-carrying heads of a China Railway High-speed (CRH) train. The structure is reliable and practical, safe, convenient and energy-saving to use and satisfies the demand for the synchronous lifting operation of the entire CRH train of the compatible pit type unwheeling machine.

6 Claims, 4 Drawing Sheets

(51) Int. Cl.
*B66F 7/14* (2006.01)
*B66F 7/28* (2006.01)

(56) References Cited

FOREIGN PATENT DOCUMENTS

| | | | | |
|---|---|---|---|---|
| CN | 201566650 | U | 9/2010 | |
| CN | 102050123 | A | 5/2011 | |
| CN | 102050123 | B | 10/2012 | |
| DE | 42 09 664 | A1 | 9/1993 | |
| DE | 43 17 528 | A1 | 12/1994 | |
| DE | 198 38 483 | C1 | 2/2000 | |
| DE | 100 33 371 | A1 | 1/2002 | |
| EP | 1 721 804 | A1 | 11/2006 | |
| GB | 2352700 | A * | 2/2001 | ............ B61D 15/00 |
| JP | S58-076359 | A | 5/1983 | |
| JP | S58-152651 | A | 9/1983 | |
| JP | S59-153652 | A | 9/1984 | |
| JP | S62-261571 | A | 11/1987 | |
| JP | 2005-170161 | A | 6/2005 | |
| JP | 2007-290601 | A | 11/2007 | |
| JP | 5583858 | B2 | 9/2014 | |
| KR | 10-0488919 | | 5/2005 | |

OTHER PUBLICATIONS

International Search Report of international PCT Application No. PCT/CN2011/075265, dated Sep. 22, 2011.
International Search Report of International Application No. PCT/CN2011/075265, dated Jun. 3, 2011.
Chinese Examination Report of China Application No. 201010581626.8, dated Nov. 30, 2011.
Chinese Granted Patent Publication No. 102050123B of corresponding China Application No. 201010581626.8, issued on Oct. 3, 2012.

* cited by examiner

TRANSVERSE ADJUSTMENT MECHANISM FOR BILATERAL HALF-SPRING TYPE LOAD-CARRYING HEAD

CROSS-REFERENCE TO RELATED APPLICATIONS

This application is a continuation of International Application No. PCT/CN2011/075265, filed on Jun. 3, 2011, which claims the priority benefit of Chinese Patent Application No. 201010581626.8, filed on Dec. 10, 2010. The contents of the above identified applications are incorporated herein by reference in their entireties.

FIELD OF THE TECHNOLOGY

The present invention relates to a load-carrying head portion of an in-ground fixed type unwheeling machine which is used in an overhaul operation of a railway locomotive, in particular to an adjustment mechanism which can realize the transverse adjustment of a no-loading head or the transverse fine adjustment of a load-carrying head.

BACKGROUND

A pit type unwheeling machine is used in non-uncoupling overhaul operation of the entire train of a China Railway High-speed (CRH) train, high-speed train, high-power locomotive or urban rail vehicle. By means of the pit type unwheeling machine, a vehicle bogie can be replaced and electrical devices at the lower part of the bodywork or on the roof can be overhauled and replaced.

When a CRH train is lifted, first, the entire train (with 16 cars or 8 cars per set) is synchronously lifted to a certain height by using a bogie lifting unit and the bogie is disassembled, then, the cars of the train are supported by the bodywork lifting unit.

The load-carrying head portion of the bodywork lifting unit is required to have a transverse adjustment function when unloaded because different CRH train cars have different lifting points. Meanwhile, a train with 16 cars per set contains 32 bogies while the length of train formation is more than 400 meters and the weight is up to 960 tons. After the overhaul operation of the entire train is completed, there is great difficulty in installing bogies, and therefore, a local transverse fine adjustment between the bodywork and the bogie is required, that is to say, in the situation that the bodywork lifting unit is loaded (also known as "load-carrying"), the load-carrying head of the bodywork lifting unit can make a certain amount of transverse fine adjustment together with the bodywork.

The traditional load-carrying head of a bodywork lifting unit mainly includes the two following types:

(1) None of the load-carrying heads of the pair of left and right bodywork lifting units can be adjusted, which can only be used for one single type of train, and the train formation is limited to 4 to 6 cars and usually used in a common subway train;

(2) Both the load-carrying heads of the pair of left and right bodywork lifting units can be transversely adjusted when loaded, but the adjustable portion is of a fully rigid structure. A big force is needed during the fine adjustment of the load-carrying head, and the left and right sides of the car needs to be synchronously adjusted at the same time, a person in one side pushes it in and a person in other side pulls it out together to realize the adjustment, due to the rigid structure, the fine adjustment of the load-carrying head with load is completely dependent on the overcome of the mechanical deformation of the device structure itself, therefore, a very big force and a handle mechanism are needed and it is very inconvenient for use.

SUMMARY

In order to overcome disadvantages of the prior art, an object of the present invention is to provide a lifting unit of an unwheeling machine which is compatible with a variety of train types and can ensure safe, reliable, convenient and efficient lifting operations.

The technical solution of the present invention is: a transverse adjustment mechanism for a bilateral half-spring type load-carrying head is installed in a casing of the load-carrying head of an lifting unit of a pit type unwheeling machine, fixedly connected to the casing, directly connected to an adjustment unit at the end of the head and installed on a lead screw of the adjustment unit. The transverse adjustment mechanism includes an adjusting nut, an adjusting nut guide, a guiding tube, a guiding sleeve, a nut mounting plate, a flange plate and a compression spring and a sliding shaft wherein a screw-nut pair structure is provided between the adjusting nut and the lead screw, the guiding tube is fixedly installed at the front end of the adjusting nut, the adjusting nut guide is fixedly installed at the rear end of the adjusting nut, the guiding sleeve and the sliding shaft are fixedly installed at the adjusting nut guide, the sliding shaft is sheathed in the guiding sleeve and the guiding sleeve is fixed on the adjusting nut guide, the sliding shaft is also sheathed in the nut mounting plate which can slide on the sliding shaft, the nut mounting plate is fixedly connected to the casing, a compression spring in which the sliding shaft is sheathed is disposed between the nut mounting plate and the adjusting nut guide, the flange plate is fixedly installed at the other end of the guiding tube, the sliding shaft is sheathed in the flange plate, a lock nut is disposed at the end of the sliding shaft and the outside of the flange plate.

Preferably, a distance between the guiding sleeve and the nut mounting plate is 40 millimeters.

Preferably, the nut mounting plate is connected to the sliding shaft through a bearing.

A gasket is disposed between the nut mounting plate and the compression spring.

The benefits of the present invention are: the interiors of the pair of the heads of the lifting unit at the left and right sides of the car both have the same structure; (2) the pair of the no-loading heads of the pair of the lifting units at the left and right sides of the car can be transversely and easily adjusted and the adjustment is labor saving; (3) the pair of the bodywork lifting units with load at the left and right sides of the car have the function of the transverse fine adjustment and an energy saving adjustment; (4) during the lifting process of the entire train, the car is kept on the original position of the rail center line without an obvious transverse (perpendicular to the direction of the rail) offset; (5) when the bogie is installed, when it is difficult to align a certain bogie of the train and the bodywork, it only needs to adjust the head of the lifting unit at one side and does not need to adjust the two sides simultaneously. The invention patent is currently suitable to the transverse adjustment of the no-loading heads of the lifting unit and transverse fine adjustment of the load-carrying heads of the pit type unwheeling machine of the CRH train. After theory analysis, experimental study and a plurality of the synchronous lifting and the replacing operations of the bogie on the site, the structure is reliable, practical, safe, convenient and energy-saving to use and satisfies the demand for the synchronous lifting operation of the entire CRH train of the compatible pit type unwheeling machine. It also can be used for other occasions involving heavy loads, long structure and transverse alignment during installation.

DETAILED DESCRIPTION

Figure 1:
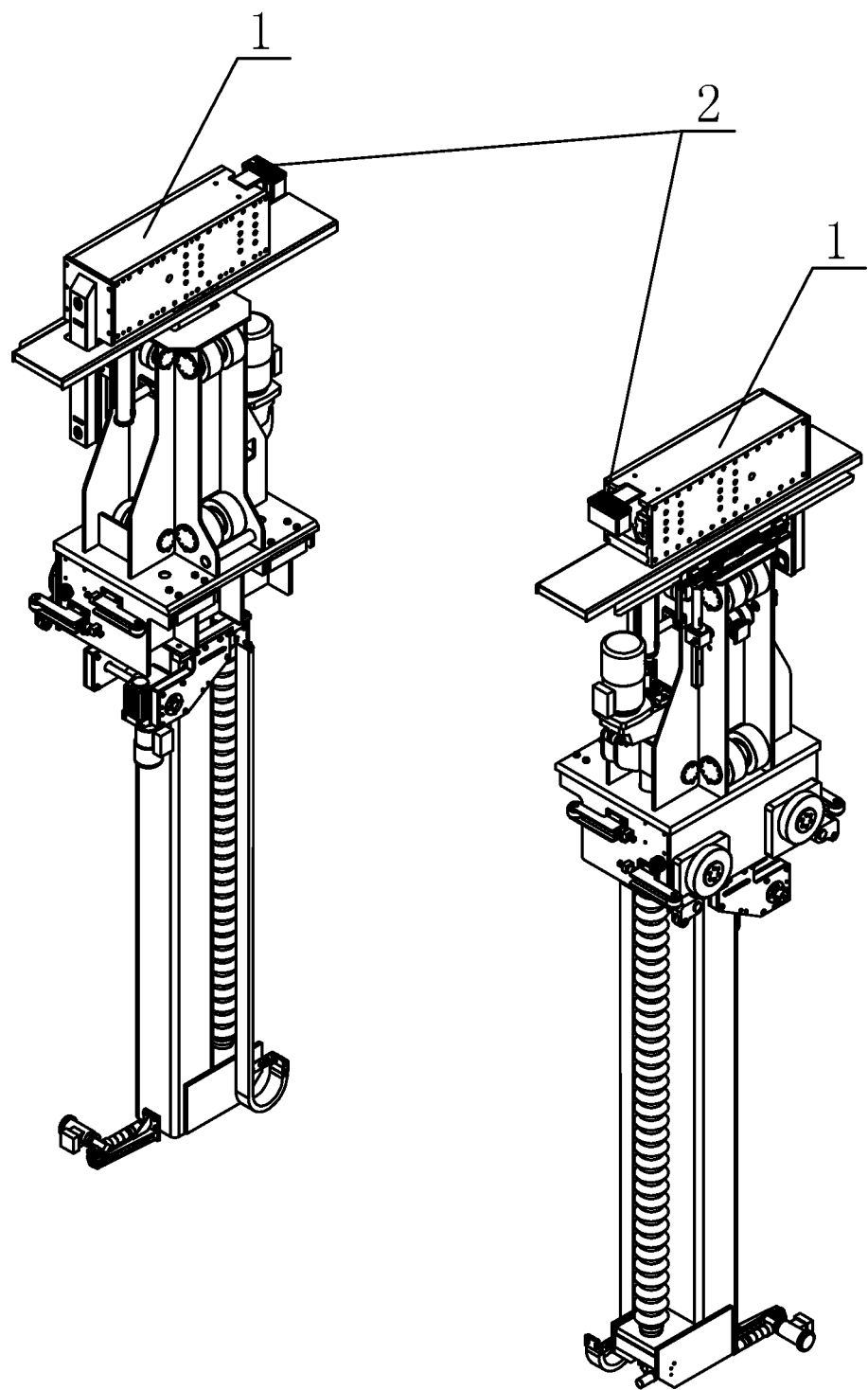
FIG. 1 is a structural schematic diagram of bodywork lifting units used in pairs according to the present invention.

Embodiments of the present invention will be described hereinafter referring to the accompanying drawings.

A transverse adjustment mechanism for a bilateral half-spring type load-carrying head is installed in a casing 1 of a load-carrying head 1 of an lifting unit of a pit type unwheeling machine, fixedly connected to the casing 1, directly connected to an adjustment unit 3 at the end of the head 2 and installed on a lead screw 4 of the adjustment unit 3. The transverse adjustment mechanism includes an adjusting nut 11, an adjusting nut guide 12, a guiding tube 110, a guiding sleeve 15, a nut mounting plate 14, a flange plate 13 and a compression spring 19 and a sliding shaft 17, wherein a screw-nut pair structure is provided between the adjusting nut 11 and the lead screw 4, the adjusting nut guide 12 is fixedly installed at the rear end of the adjusting nut 11, the guiding sleeve 15 and the sliding shaft 17 are fixedly installed at the adjusting nut guide 12, the sliding shaft 17 is sheathed in the guiding sleeve 15 and the guiding sleeve 15 is fixed on the adjusting nut guide 12, the sliding shaft 17 is also sheathed in the nut mounting plate 14 which can slide on the sliding shaft 17, the nut mounting plate 14 is fixedly connected to the casing 1, a compression spring 19 in which the sliding shaft 17 is sheathed is disposed between the nut mounting plate 14 and the adjusting nut guide 12, the guiding tube 110 is fixedly installed at the front end of the adjusting nut 11, the flange plate 13 is fixedly installed at the other end of the guiding tube 110, the sliding shaft 17 is sheathed in the flange plate 13, a lock nut 18 is disposed at the end of the sliding shaft 17 and the outside of the flange plate 13. When the compression spring 19 is compressed to a certain degree, the guiding sleeve 15 can abut against the nut mounting plate 14. The guiding sleeve 15 is used to limit the maximum stroke of the compression spring 19, according to the requirement that the transverse fine adjustment amount of the load-carrying head is +/−25 millimeters, in consideration of the deformation of the lifting column, the gap and other uncertainties and so on, a distance between the guiding sleeve 15 and the nut mounting plate 14 is about 40 millimeters. The nut mounting plate 14 is connected to the sliding shaft 17 through a bearing 16. A gasket 111 is disposed between the nut mounting plate 14 and the compression spring 19.

The mechanism is an important part of the load-carrying head of the bodywork lifting unit of the pit type unwheeling machine, installed in the casing 1 of the load-carrying head of the bodywork lifting unit of the pit type unwheeling machine and directly connected to the end of the load-carrying head of the adjustment unit end so as to achieve the function of the transverse adjustment of the no-loading head (the stroke is 410 millimeters) and the transverse fine adjustment of the load-carrying head (the fine adjustment amount is +/−25 millimeters).

Figure 2:
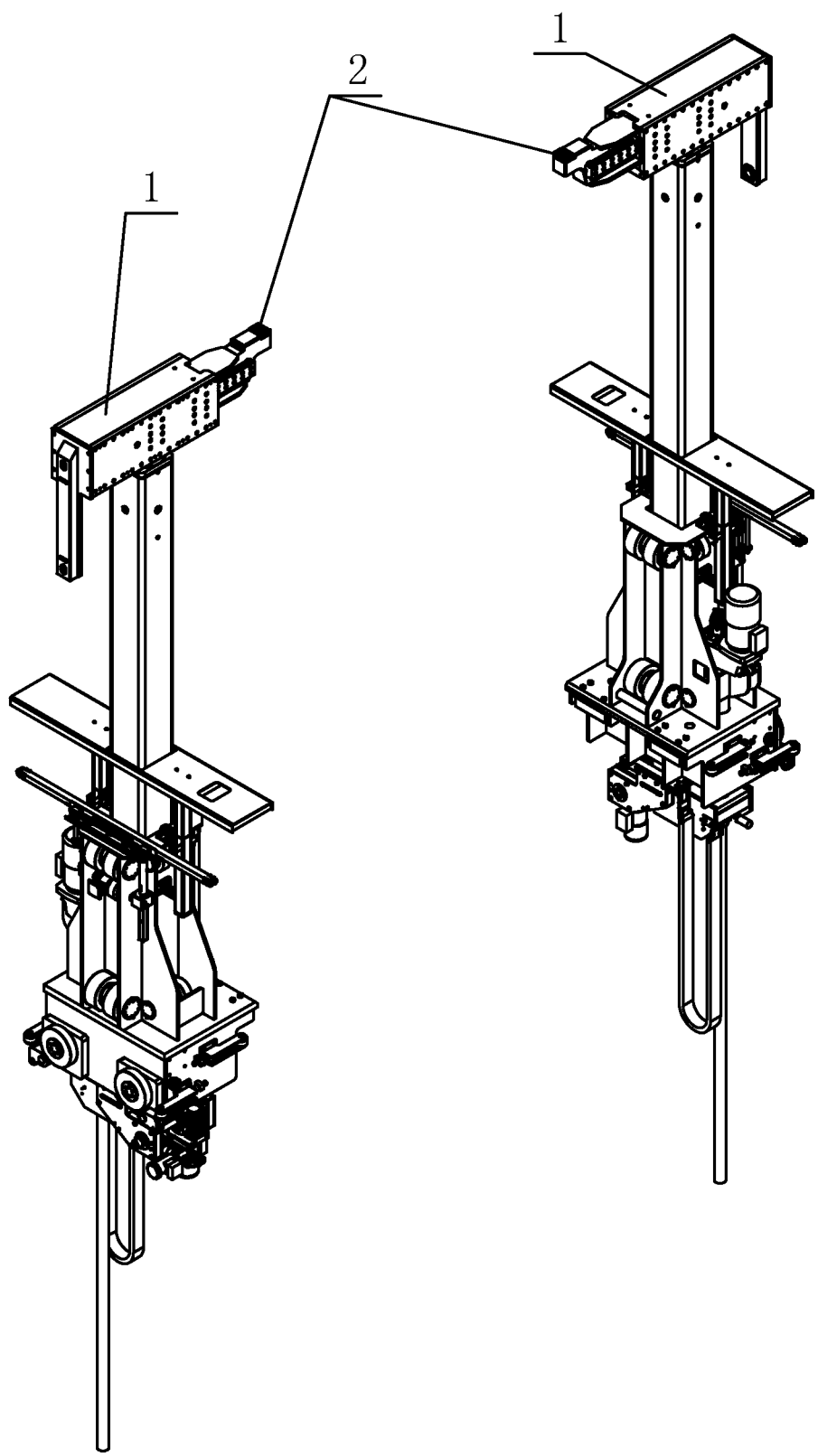
FIG. 2 is a schematic diagram of bodywork lifting units used in pairs in a working state according to the present invention.
Figure 3:
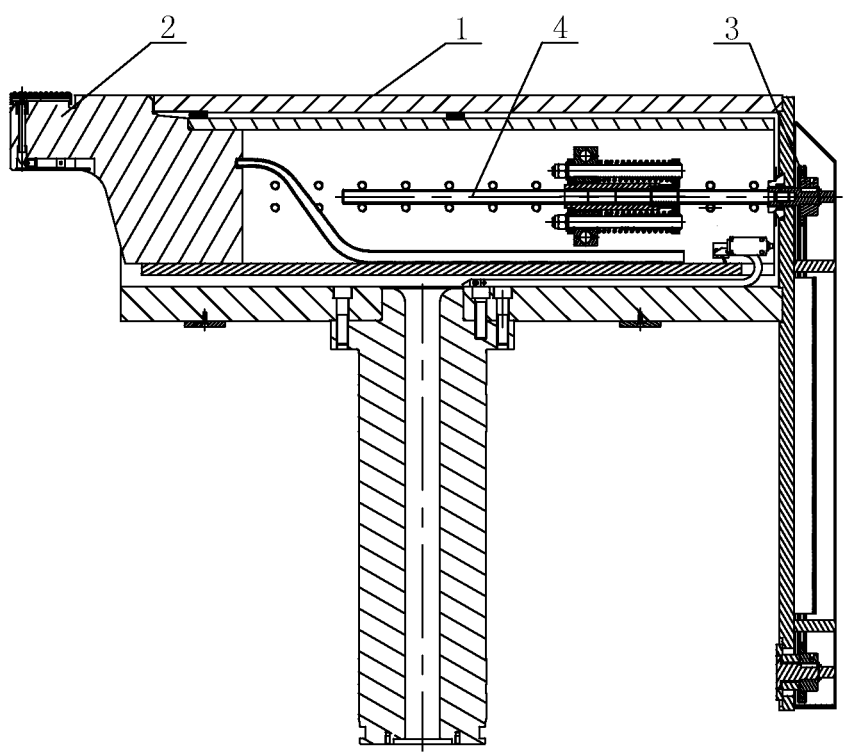
FIG. 3 is a structural schematic cross-sectional diagram of a head of a bodywork lifting unit according to the present invention.
Figure 4:
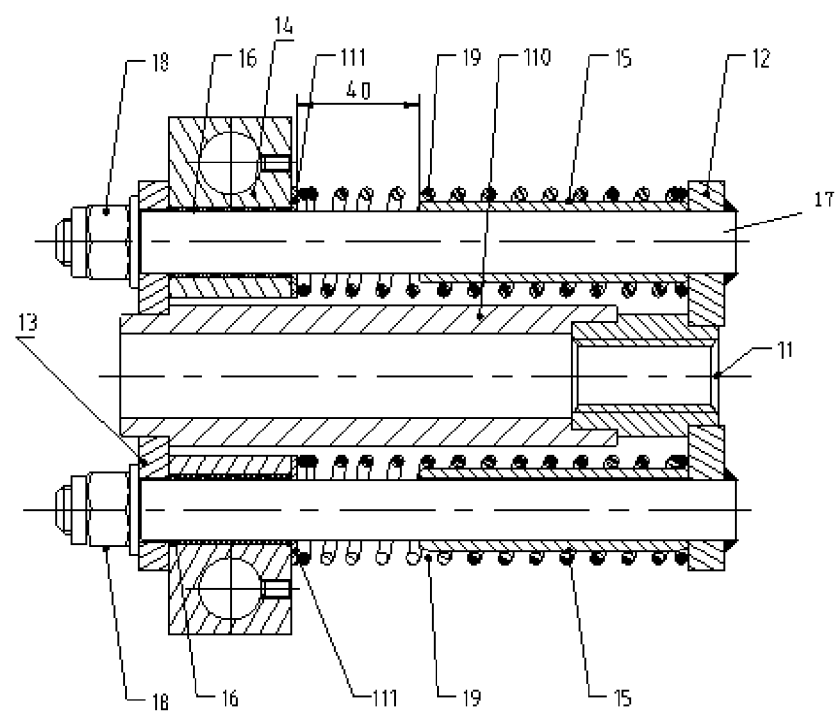
FIG. 4 is a structural schematic cross-sectional diagram according to the present invention.

Working process is as follows: as shown in FIG. 1, the load-carrying head 2 is rotated by 90 degrees during working, as shown in FIG. 2.

(1) When the head 2 is not in the lifting state, that is, the head 2 is in no-loading state, the working processes of the left side and the right side heads are as follows.

In order to meet the lifting operation requirement of different types of CRH trains, if the left side head is transversely adjusted to let it transversely back toward left, the rotation of the lead screw 4 drives the adjusting nut 11 to move toward left by adjusting the handle to clockwise rotate the adjustment unit 3 at the left side; the movement of the adjusting nut 11 pushes the adjusting nut guide 12, the guiding tube 110 and the flange plate 13 to move toward left; the movement will directly drive the nut mounting plate 14, the nut mounting plate 14 will transfer the force to the straight pin; since the straight pin is directly connected to the head 2, the head 2 will be back toward left under the drive of the straight pin.

Otherwise, if the head 2 needs to be protruded to meet the requirement of other types of the trains, then the above-mentioned handle of the adjustment unit 3 can be reversely adjusted (counterclockwise), the force transfer process is as follows: the handle of the adjustment unit 3→the lead screw 4→the adjusting nut 11→the guiding tube 110→the adjusting nut guide 12→the compression spring 19 (or the guiding sleeve 15)→the nut mounting plate 14→the straight pin→the head 2 moves toward right and protrudes.

The no-loading heads of the pair of left and right bodywork lifting units are in an independent state, therefore the adjustment of the right side head is the same as that of the left side head. By the above adjustment process, the head of the bodywork lifting unit and the lifting positions of the cars of the entire train are simply and accurately aligned one by one.

(2) When head is in the lifting state, that is, the head is in load-carrying state, the working processes of the transverse fine adjustment of the left side and the right side load-carrying heads are as follows.

When the train is lifted to a certain height and needs to be installed with a bogie, if it is found that the bogie and the bodywork cannot be aligned, the car needs to be transversely moved to realize the fine adjustment. Providing that the car needs to be moved toward left, then the transverse adjustment can be done at the left side head to let it transversely back toward left, the rotation of the lead screw 4 drives the adjusting nut 11 to move toward left by adjusting the handle to clockwise rotate the adjustment unit 3 at the left side; the movement of the adjusting nut 11 will drive the adjusting nut guide 12, the guiding tube 110 and the flange plate 13 to move toward left; the movement will directly drive the nut mounting plate 14, the nut mounting plate 14 will transfer the force to the straight pin; the straight pin is directly connected to the head, therefore the head 2 will be back toward left under the drive of the straight pin.

However the car of the train is located on the heads of the two lifting units, a vertical pressure exists between the car and the head such that there is a very large friction force between the two, that is to say, a relative sliding phenomenon between the car and the left and right heads will not occur. At this time, the left head will drive the car to move toward left, however the car drive the right side load-carrying head to protrude toward left by the friction force at the same time as the car moves toward left, the protrusion of the head drives the nut mounting plate 14 of the right side head and the straight pin to move toward left and then the movement is transferred to the adjusting nut guide component 12 by the flange plate 13, this movement will compress the spring 19 until the guiding sleeve 15 totally abuts against the nut mounting plate 14. The transverse fine adjustment of the load-carrying head may be realized by the above force transfer process. On the contrary, if the car needs to be adjusted toward right side, the handle should be rotated at the handle of the right side bodywork lifting unit.

The direction of the fine adjustment should always be clockwise no matter the adjustment is in the left side or in the right side. By this process, when the bogie is replaced, a transverse fine adjustment of the bodywork lifting units with load in the amount of +/−25 millimeters can be achieved to satisfy the requirement of practical application of lifting operation.

Finally, it should be noted that the above embodiments are merely provided for describing the technical solutions of the present invention, but not intended to limit the present invention. It should be understood by persons skilled in the art that although the present invention is described in detail with reference to the foregoing embodiments, modifications can be made to the technical solutions described in the foregoing embodiments, or equivalent replacements can be made to some technical features in the technical solutions, without departing from the spirit and scope of the embodiments of the present invention.

What is claimed is:

1. A transverse adjustment mechanism for a bilateral half-spring type load-carrying head, which is installed in a casing (1) of the load-carrying head (2) of a lifting unit of a pit type unwheeling machine, fixedly connected to the casing (1), directly connected to an adjustment unit (3) at the end of the load-carrying head (2) and installed on a lead screw (4) of the adjustment unit (3), characterized in that, the transverse adjustment mechanism comprises an adjusting nut (11), an adjusting nut guide (12), a guiding tube (110), a guiding sleeve (15), a nut mounting plate (14), a flange plate (13), a compression spring (19) and a sliding shaft (17); wherein a screw-nut pair structure is provided between the adjusting nut (11) and the lead screw (4), the guiding tube (110) is fixedly installed at the front end of the adjusting nut (11), the adjusting nut guide (12) is fixedly installed at the rear end of the adjusting nut (11), the guiding sleeve (15) and the sliding shaft (17) are fixedly installed at the adjusting nut guide (12), the sliding shaft (17) is sheathed in the guiding sleeve (15) and the guiding sleeve (15) is fixed on the adjusting nut guide (12), the sliding shaft (17) is also sheathed in the nut mounting plate (14) which can slide on the sliding shaft (17), the nut mounting plate (14) is fixedly connected to the casing (1), a compression spring (19) in which the sliding shaft (17) is sheathed is disposed between the nut mounting plate (14) and the adjusting nut guide (12), one end of the guiding tube (10) is connected to the adjusting nut (11), the flange plate (13) is fixedly installed at the other end of the guiding tube (110), the sliding shaft (17) is sheathed in the flange plate (13), a lock nut (18) is disposed at the end of the sliding shaft (17) and the outside of the flange plate (13).

2. The transverse adjustment mechanism for a bilateral half-spring type load-carrying head of claim 1, characterized in that, a distance between the guiding sleeve (15) and the nut mounting plate (14) is about 40 millimeters.

3. The transverse adjustment mechanism for a bilateral half-spring type load-carrying head of claim 2, characterized in that, the nut mounting plate (14) is connected to the sliding shaft (17) through a bearing (16).

4. The transverse adjustment mechanism for a bilateral half-spring type load-carrying head of claim 2, characterized in that, a gasket (111) is disposed between the nut mounting plate (14) and the compression spring (19).

5. The transverse adjustment mechanism for a bilateral half-spring type load-carrying head of claim 1, characterized in that, the nut mounting plate (14) is connected to the sliding shaft (17) through a bearing (16).

6. The transverse adjustment mechanism for a bilateral half-spring type load-carrying head of claim 1, characterized in that, a gasket (111) is disposed between the nut mounting plate (14) and the compression spring (19).

* * * * *